United States Patent
Gaudern

(10) Patent No.: US 12,523,196 B2
(45) Date of Patent: Jan. 13, 2026

(54) COMPUTER SYSTEM FOR CALCULATING AEP CHANGES OF A WIND TURBINE DUE TO IDENTIFIED STRUCTURAL DETERIORATION OF THE BLADES AND METHOD OF MAINTAINING A WIND TURBINE

(71) Applicant: POWER CURVE ApS, Aalborg (DK)

(72) Inventor: Nicholas Gaudern, Aalborg (DK)

(73) Assignee: POWER CURVE ApS, Aalborg (DK)

( * ) Notice: Subject to any disclaimer, the term of this patent is extended or adjusted under 35 U.S.C. 154(b) by 298 days.

(21) Appl. No.: 18/053,136

(22) Filed: Nov. 7, 2022

(65) Prior Publication Data

US 2023/0144150 A1    May 11, 2023

(30) Foreign Application Priority Data

Nov. 5, 2021 (DK) .............................. PA202170545

(51) Int. Cl.
*F03D 7/04* (2006.01)
*F03D 17/00* (2016.01)

(52) U.S. Cl.
CPC .............. *F03D 7/045* (2013.01); *F03D 17/00* (2016.05); *F05B 2260/84* (2013.01); *F05B 2270/332* (2013.01)

(58) Field of Classification Search
CPC .............. F03D 7/045; F03D 7/04; F03D 17/00
See application file for complete search history.

(56) References Cited

U.S. PATENT DOCUMENTS 9,347,432 B2 *   5/2016   Herrig .................... F03D 7/0296
10,927,813 B2 *  2/2021   Picard .................... F03D 17/00
(Continued)

FOREIGN PATENT DOCUMENTS

EP    3786450 A1    3/2021

OTHER PUBLICATIONS

Cappugi, Lorenzo, et al. "Machine learning-enabled prediction of wind turbine energy yield losses due to general blade leading edge erosion." Energy Conversion and Management 245 (2021): 114567 (17 pages).

(Continued)

*Primary Examiner* — Michael L Sehn
(74) *Attorney, Agent, or Firm* — Bookoff McAndrews, PLLC

(57) ABSTRACT

A computer system suitable for estimating the expected change in annual energy production (AEP) of a wind turbine due to structural deterioration of blades of the wind turbine, said computer system being arranged to execute the following steps: loading a dataset representing estimated lift and drag curves at specific radial locations along the original blade of the wind turbine, building a baseline BEM model of the wind turbine based on said estimated lift and drag curves of the original blade and analysing the model to provide a baseline AEP estimation of the wind turbine with original blades, loading a dataset representing aerodynamic effects of identified structural deteriorations at specific radial locations along each of the blades of the wind turbine, using the dataset of aerodynamic effects to generate modified lift and drag curves at specific radial locations along each of the blades.

13 Claims, 4 Drawing Sheets

(56) References Cited

U.S. PATENT DOCUMENTS

| 2016/0032893 A1 | 2/2016 | Herrig et al. |
| 2018/0142674 A1 | 5/2018 | Hammerum et al. |
| 2019/0345915 A1 | 11/2019 | Picard et al. |
| 2021/0123416 A1 | 4/2021 | Vestergaard et al. |

OTHER PUBLICATIONS

Translation of Danish Search Report issued in corresponding Danish Application No. 202170545, dated May 3, 2022 (4 pages).
International Search Report issued Mar. 14, 2023 for corresponding International Application No. PCT/EP2022/080971 (6 pages).

* cited by examiner

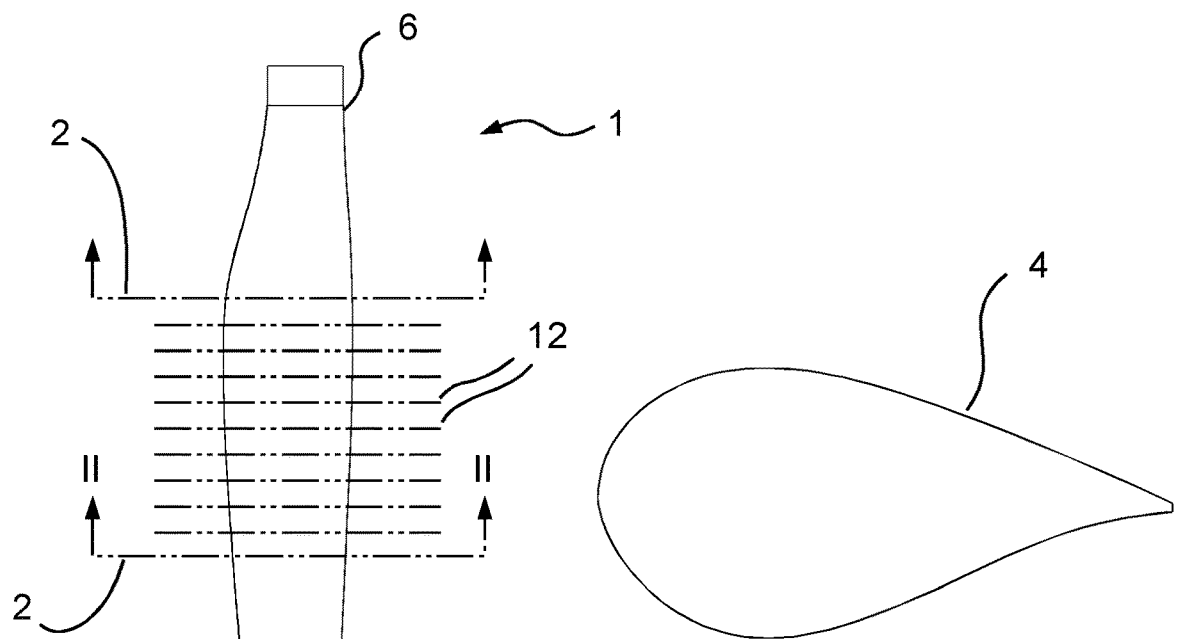
Fig. 2
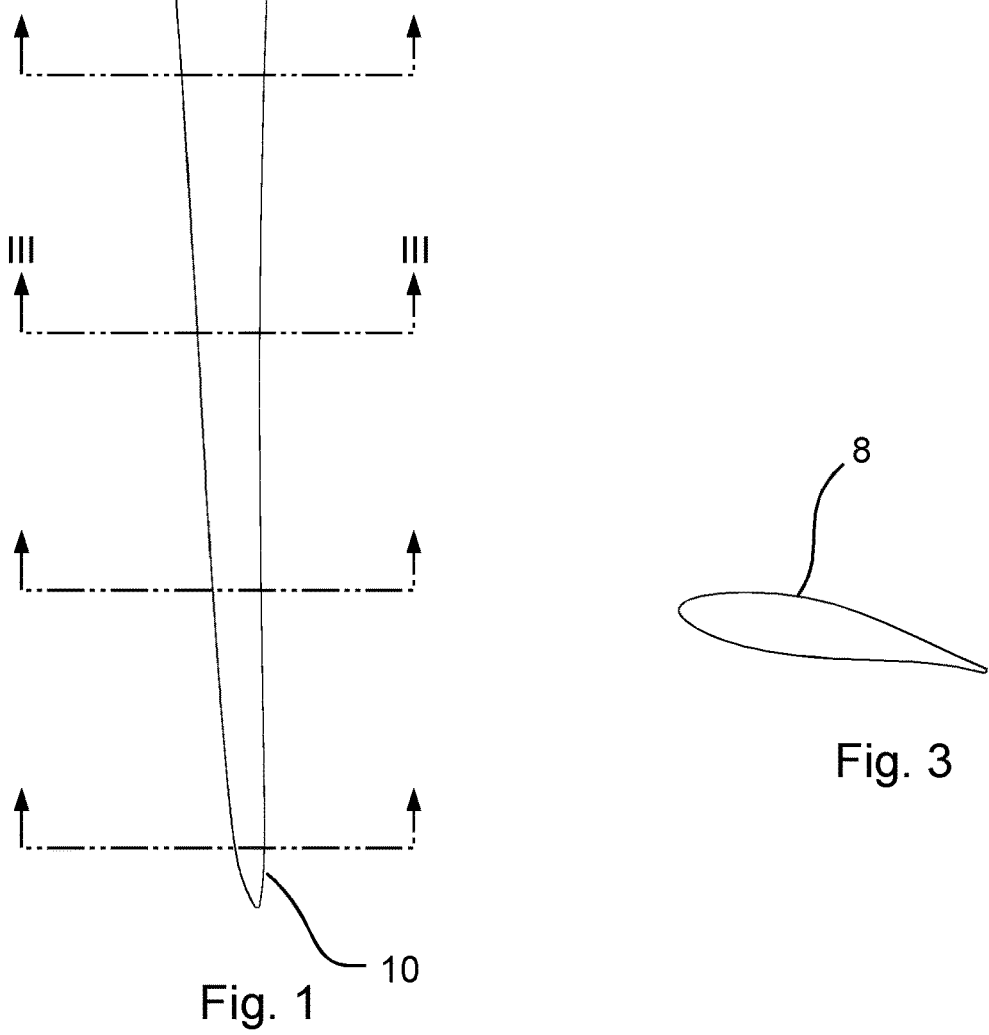
Fig. 3
Fig. 1

COMPUTER SYSTEM FOR CALCULATING AEP CHANGES OF A WIND TURBINE DUE TO IDENTIFIED STRUCTURAL DETERIORATION OF THE BLADES AND METHOD OF MAINTAINING A WIND TURBINE

CROSS-REFERENCE TO RELATED APPLICATIONS

This application claims the benefit of priority under 35 U.S.C. § 119 from Denmark Application No. PA202170545, filed Nov. 5, 2021, which is incorporated by reference herein in its entirety.

The current invention relates to a computer system for calculating AEP changes of a wind turbine due to identified structural deterioration of the blades. The current invention also relates to a method of maintaining a wind turbine which makes use of a computer system for calculating AEP changes of a wind turbine due to identified structural deterioration of the blades and exchanging one or more of the blades based on the outcome of the calculated AEP changes.

According to the current specification, the term "structural deterioration of the blade" should cover any form of change to the structure of the blade which is not desired or not intended. Some non-limiting examples of structural deteriorations are dirt, dust, mould/algae, structural damage and missing parts. Some non-limiting examples of structural damage are cracks, Leading Edge (LE) erosion, lightning damage, etc. Some non-limiting examples of missing parts could be Vortex Generators (VGs) which have fallen off, Trailing Edge Serrations which have fallen off, Gurney Flaps (GFs) which are completely or partly missing, etc. It should also be noted that the system of the current invention is designed to calculate changes due to structural deteriorations; however, a similar procedure could also be used to estimate the effects of repairs and/or addition of aerodynamic add-ons to the blades. This could either be via a single analysis which combines the effects of deteriorations and repairs/optimizations or via separate analyses.

Furthermore, according to the current specification, the phrase "identified structural deterioration of the blades" should be understood as actual structural deterioration identified and/or measured on an actual blade. The identified structural deteriorations could be identified and/or measured by a human looking at a photo taken by a drone, a human looking at a photo taken by a long range camera, an AI software algorithm which analyses photos taken by a drone, etc.

Furthermore, according to the current specification, the terms "lift and drag curves" should be understood as curves which represent the lift and drag characteristics of an airfoil. This is typically represented by a first curve showing the coefficient of Lift (CL) versus the Angle of Attack (AoA) and a second curve showing the coefficient of Drag (CD) versus the Angle of Attack (AoA). However, other forms of curves can also be used as will be known by the person skilled in the art of aerodynamics. Furthermore, it should be noted that the curves can be stored in different formats. In one embodiment, a 2D lookup table representing points on the curve are stored. In another embodiment, a set of parameters are stored, it being possible to generate a curve based on the set of stored parameters. For example, $C_{Lmax}$, $C_L$ at 0°, AoA at $C_{Lmax}$, etc. Both options are described in more detail below. Additional possibilities will be known to the person skilled in the art.

DESCRIPTION OF RELATED ART

It is known in the art to identify structural deteriorations on wind turbine blades in order to assess lifetime expectancy of the blades and to schedule repair work. This identification of structural deteriorations to wind turbine blades is typically done via an analysis of photographs taken of the blades. The photographs could be taken via drones, telephoto cameras, etc., The image analysis is typically done via human experts who review multiple images of the blades, but lately some image analysis has also been done via Artificial Intelligence software.

It is also known that detailed aerodynamic analysis of wind turbines with blades which have structural deteriorations can be done via Computational Fluid Dynamics (CFD) software. However, with current computers, it is often too complicated and time consuming to do CFD analysis of damaged or otherwise deteriorated blades. Hence, the aerodynamic effects of structural deteriorations on wind turbine blades are not often analysed. In any case, the analysis is not typically performed for a complete wind turbine park. Some theoretical work has also been done on modelling the effects on the AEP of a wind turbine due to leading edge erosion. However, the resulting models have been limited to erosion and have required the use of large databases of CFD results.

SUMMARY OF THE INVENTION

It is therefore a first aspect of the current invention to provide a computer system which provides a more efficient calculation of the effects of structurally deteriorated blades on the AEP of a wind turbine.

It is a second aspect of the current invention to provide a computer system which requires less computational power to calculate the relative AEP changes for a number of wind turbines in a wind turbine park.

It is a third aspect of the current invention to provide a computer system which makes it possible to convert existing structural deterioration. evaluation data into aerodynamic effect data in an easy manner.

It is a fourth aspect of the current invention to provide a computer system which makes it possible to calculate the effect of a larger number of types of structural deterioration than prior art methods in an easy manner.

At least some of these aspects are provided at least in part according to the features of claim 1.

According to this specification, the term "dataset" should be understood in a broad way. The dataset could be tables of data stored in a database, they could be text files stored on a computer, or in any other form which the person skilled in the art of computer systems could provide.

Via this computer system which is arranged as claimed, it becomes possible to analyse a much greater number of wind turbines in a much shorter time span due to the technical implementation of the computer system. Traditional aerodynamic analysis would be based on a CFD analysis of 3D structures where the structural deteriorations would need to be modelled on each blade and on each wind turbine. This would require a huge amount of work to model all the blades. Furthermore, storing the 3D models of all the blades would require a large data volume. Furthermore, running the CFD analysis on all the 3D models would require a huge amount of time and computing power. Via the computer system provided, a very small data set is needed and the amount of computational power required is reduced by many magnitudes.

Furthermore, if the analysis were to be repeated a year later on the same turbine with new identified structural deformations, a completely new 3D model would need to be developed and completely new CFD analysis would need to be made with the prior art system. With the system according to the current invention, the dataset representing the aerodynamic effects of identified structural deteriorations would need to be updated, and the model run again, but this would require many orders of magnitude less work and less computing power.

In other cases, it has previously been suggested to make a general statement about structural damage on wind turbines, where an "expert" makes an AEP adjustment evaluation based on "experience". In this prior art case a very simple and generic aerodynamic model is suggested, which has shown not to provide data which can be used effectively and repeatedly to make decisions about maintenance.

According to this specification, the term "BEM model" should be understood as referring to a model of a wind turbine built according to the "Blade Element Momentum" (BEM) theory. Many references exist which describe the BEM theory in detail and the person skilled in the art of wind turbines will be familiar with the BEM theory. Hence, the BEM theory will not be described in more detail here.

In some embodiments, the expected change in AEP of the wind turbine is found by comparing the baseline AEP estimation with the estimated AEP generated by the modified BEM model.

In some embodiments, the step of using the dataset of aerodynamic effects to generate modified lift and drag curves at specific radial locations along each of the blades comprises the steps of looking up the aerodynamic effect at a specific location in a table and generating a modified lift and drag curve for that specific aerodynamic effect based on the information in the table. In this way, a new CFD analysis for every location can be avoided. In some embodiments, the steps of looking up the aerodynamic effect matches a specific aerodynamic effect at a specific location to a specific lift and drag curve taken from a discrete number of options without the use of a CFD analysis for that specific location.

In some embodiments, a separate modified BEM model is generated for each blade of the wind turbine, each separate modified BEM model being based on the aerodynamic effects of the identified structural deteriorations of one of the blades and then the estimated AEP of the separate modified BEM models for the separate blades are combined to get an estimated AEP for the entire turbine. In this way, it is possible to get a, model which takes into account the different damages on each of the blades. This is not typically necessary if Leading Edge erosion, mould or dust/dirt is being modelled, since these types of damages will usually be uniform on all the blades. However, in the real world, each blade will have its own unique damages.

In some embodiments, a separate BEM model is generated for each blade, the estimated AEP of each of the separate BEM models is calculated and then the estimated AEP of each of the separate BEM models is summed and then divided by the number of blades. In some embodiments, if there are N blades on the turbine, then N modified BEM models will be generated, one for each blade, and each of the modified BEM models will represent a wind turbine comprising N blades where it is assumed that the structural deterioration of all the blades is identical to the blade for which the model is generated.

In some embodiments, the dataset representing aerodynamic effects of identified structural deterioration is generated by loading a dataset representing identified structural deteriorations of the blades comprising type of deterioration, severity of deterioration and location on the blade, and applying a transfer function which converts the type and severity of the structural deterioration at each blade location to an aerodynamic effect at said blade location and stores it in the dataset representing aerodynamic effects.

For the sake of this specification, the term "transfer function" should be understood as a function which takes as input the dataset representing structural deteriorations and outputs a dataset representing aerodynamic effects. The transfer function could be a lookup table based routine, a computer software procedure, etc. In some embodiments, the transfer function takes as input a discrete number of predefined input options and translates these input options into a discrete number of predefined output options.

In embodiments where the input is provided as a dataset of structural deteriorations and where the computer system applies a transfer function, the data representing the actual wind turbine blade can be described by a simple dataset and converted in a simple manner which allows the computer system to generate an AEP analysis in a very much accelerated manner when compared to the prior art methods. In effect, the computer system as claimed herein, reduces the amount of memory needed and the amount of computational power required to calculate the AEP change.

In some embodiments, the dataset representing structural deteriorations is generated by loading images of a blade of a wind turbine, showing the images to an evaluator which evaluates the images and identifies specific types of structural deteriorations, their severity and their radial location on the wind turbine blade, and enabling the evaluator to enter data related to the identified structural deteriorations into the computer system and storing said data in the dataset, said data including at least an identification of the wind turbine, an identification of the wind turbine blade, the type of structural deterioration, a rating of the severity of the deterioration and the radial location of the structural deterioration on the blade.

According to this specification, the term "evaluator" should be interpreted broadly to encompass both humans or computers based systems.

In some embodiments, the type of structural deterioration is chosen from a closed list of standard options and the rating of the severity is chosen according to a standardized scale. By using standardized options, it is possible to apply the same transfer function to different wind turbines.

In some embodiments, the dataset representing aerodynamic effects of identified structural deterioration is generated by loading images of a wind turbine, showing the images to an evaluator which evaluates the images and identifies specific types of structural deteriorations, their severity and their radial location on the wind turbine blades, and enabling the evaluator to enter data related to the aerodynamic effects of the identified structural deteriorations into the computer system and storing said data in the dataset, said data including at least an identification of the wind turbine, an identification of the wind turbine blade, the aerodynamic effect of the structural deterioration and the radial location of the structural deterioration on the blade.

In some embodiments, the computer system comprises a display and a human machine interface for entering data by a human user and the computer system is arranged to display the images on the display and accept data input related to the evaluation of the structural deterioration from a human user.

In some embodiments, the evaluator is a software based image recognition system and the software based imaged recognition system enters data related to the structural deteriorations directly into the dataset stored in the computer system. In some embodiments, the software based image recognition system includes software which applies an artificial intelligence algorithm.

In some embodiments, the dataset representing estimated lift and drag curves at specific radial locations along the original blade of a wind turbine is generated by the computer system which is arranged to execute the following steps: loading a 3D model of the original blade and applying CFD analysis to the loaded 3D model of the original blade to generate a table of estimated lift and drag curves at specific radial locations along the original blade.

In some embodiments, the dataset representing estimated lift and drag curves at specific radial locations along the original blade of a wind turbine is generated by the computer system which is arranged to execute the following steps: loading a 3D model of the original blade, slicing the 3D model at specific radial locations along the original blade to get a 2D aerofoil, and applying a 2D CFD analysis to each 2D aerofoil to generate a table of estimated lift and drag curves at specific radial locations along the original blade.

In some embodiments, modified lift and drag curves which take the structural deteriorations into account are based at least partly on CFD modelling of an example of typical structural deterioration with varying degrees of severity.

In some embodiments, modified lift and drag curves which take the identified structural deteriorations into account are generated by applying a table of penalty factors to the parameters of baseline curves.

In some embodiments, the computer system is further arranged to load datasets representing aerodynamic effects of identified structural deteriorations related to multiple wind turbines and perform the same estimation of AEP change on each of the multiple wind turbines to generate a dataset representing the estimated change in AEP of the multiple wind turbines. In this way, it is possible to identify which wind turbines in a park have structural deteriorations which have the most impact on the AEP of the turbine. In this way, it is possible to prioritize maintenance work to optimize the overall AEP of the wind turbine park.

In some embodiments, the computer system comprises a structural deterioration model representing an estimation of the development of structural deteriorations of the blades over time and in that the computer system is arranged to apply the structural deterioration model to the current structural deterioration data to develop a future estimate of the structural deterioration data of a blade at a point of time in the future and then to rerun the analysis for aerodynamic effects with the estimated future structural deterioration to find the estimated AEP change at a point of time in the future.

In some embodiments, planned structural repairs or upgrades are included in the model of the changes to the blade over time so that planned improvement strategies can be evaluated over time.

In some embodiments, the computer system comprises system components located at separate locations. For example, the computer system could comprise a cloud connected server at one location and a client workstation at another location. In some embodiments, the step of identifying the structural deteriorations is performed via a system component located at a first location and the step of calculating the estimated AEP changes is performed at a second location. For example, the identification step could be performed at a client workstation belonging to an expert who analyses the image data and the datasets comprising the identifications of the structural deteriorations are stored on a cloud connected server. The computer system could further comprise additional system components. For example, the system could comprise an additional client workstation on which the estimated data is displayed. Different options are available as will be known to the person skilled in the art of computer systems.

The current invention also relates to a method for maintaining a wind turbine with a number of blades, the method including: acquiring images showing the surfaces of the blades; analysing the images to identify specific types of structural deteriorations, their severity and their radial location on the blades; loading data related to the identified structural deteriorations into a computer system and storing said data in a dataset representing structural deteriorations, said dataset including at least an identification of the wind turbine, an identification of the blade, the type of structural deterioration, a rating of the severity of the deterioration and the radial location of the structural deterioration on the blade; the computer system applying a transfer function which converts the type and severity of the structural deterioration at each radial blade location to an aerodynamic effect at said radial blade location and storing it in a dataset representing aerodynamic effects; said computer system loading a dataset representing estimated lift and drag curves at specific radial locations along the blades; said computer system building a baseline Blade Element Momentum (BEM) model of the wind turbine based on said estimated lift and drag curves of the blades and analysing the model to provide a baseline AEP estimation of the wind turbine with original blades; said computer system using the dataset representing aerodynamic effects to generate modified lift and drag curves at the specific radial locations along each of the blades; said computer system building a modified BEM model of the wind turbine based on the modified lift and drag curves; said computer system analysing the modified BEM model to calculate the AEP of the wind turbine when the identified structural deteriorations of the blades are taken into account; and based at least on the output of the calculation, selectively repairing or replacing one or more of the blades of the wind turbine. In this way, the repair and/or replacement activities of the blades of a wind turbine is based on aerodynamic considerations as well as structural considerations.

In some embodiments, the step of exchanging or repairing one or more of the blades of the wind turbine is performed if the estimated AEP of the wind turbine with the structural deteriorations is lower than a predefined value or if the reduction in AEP is higher than a predefined value.

The current invention also relates to a method of maintaining an actual wind turbine park comprising multiple actual wind turbines, each wind turbine including a number of blades, the method including: for each wind turbine of the plurality of wind turbines; acquiring images showing the surface of the blades; analysing the images to identify specific types of structural deteriorations, their severity and their radial location on the blades; loading data to the identified structural deteriorations into a computer system and storing said data in a dataset representing structural deteriorations, said dataset including at least an identification of the wind turbine, an identification of the blade, the type of structural deterioration, a rating of the severity of the deterioration and the radial location of the structural deterioration on the blade; the computer system applying a transfer function which converts the type and severity of the structural deterioration at each radial blade location to an aerodynamic effect at said radial blade location to an aerodynamic effect at said radial blade location and storing it in a dataset representing aerodynamic effects; said computer system loading a dataset representing estimated lift and drag curves at specific radial locations along the blades; said computer system building a baseline Blade Element Momentum (BEM) model of the wind turbine based on said estimated lift and drag curves of the blades and analysing the model to provide a baseline AEP estimation of the wind turbine with original blades; said computer system using the dataset representing aerodynamic effects to generate modified lift and drag curves at the specific radial locations along each of the blades; said computer system building a modified BEM model of the wind turbine based on the modified lift and drag curves; said computer system analysing the modified BEM model to calculate the AEP of the wind turbine when the identified structural deteriorations of the blades are taken into account; and based at least on the output of the calculations for the AEP of the each wind turbine in said plurality of wind turbines, selectively repairing and/or replacing one or more of the blades of one or more of the wind turbines. In some embodiments, the method can include wind turbines in different wind turbine parks.

In some embodiments of the method, the blades of the wind turbine which has the highest calculated reduction in AEP are repaired and/or replaced first.

In some embodiments of the method, the replacement and/or repair schedule for the wind turbines in the wind turbine park is based at least in part on the calculated AEP losses for the wind turbines. In this way, the repair and/or replacement of wind turbines blades of wind turbines in the wind turbine park can be prioritized based on aerodynamic considerations. In some embodiments, the replacement and/or repair schedule for the wind turbines in the wind turbine park is based partly on structural considerations and partly on aerodynamic considerations. For example, once the most critical structural repairs are made, then the most critical aerodynamic repairs are made so that the wind turbine park runs at an optimal level for financial profit.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

FIG. 1 schematically shows a wind turbine blade with markings at separate main radial locations and sub radial locations to illustrate the calculation method.

FIG. 2 schematically shows a cross section through a first section of the blade which is closer to the root of the blade and is defined by the line II-II in FIG. 1.

FIG. 3 schematically shows a cross section through a second section of the blade which is closer to the tip of the blade and is defined by the line III-III in FIG. 1.

DETAILED DESCRIPTION OF THE EMBODIMENTS

Figure 4:
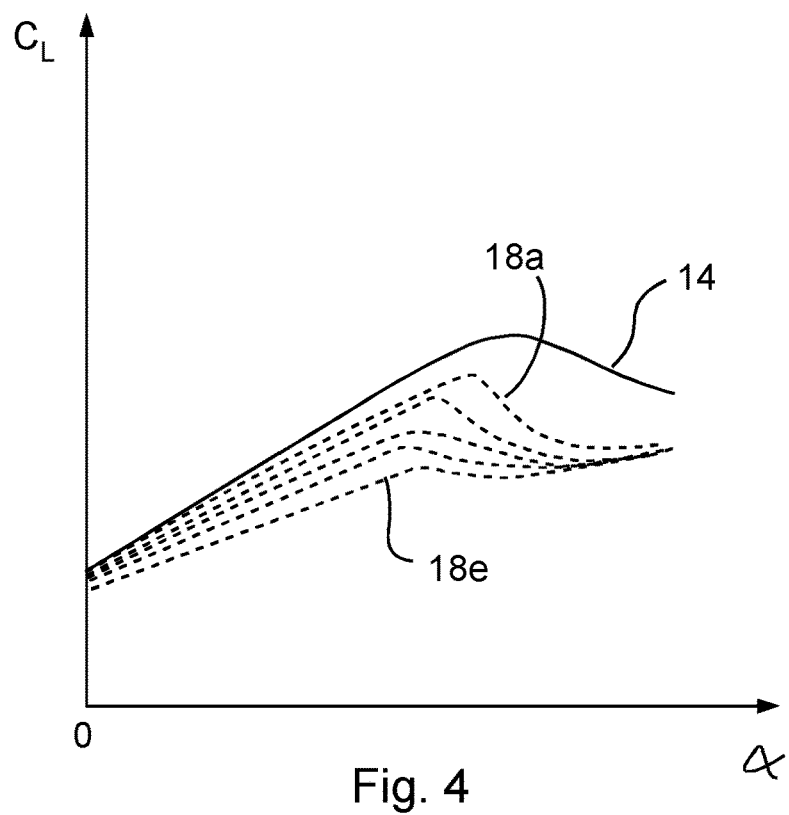
FIG. 4 schematically shows an example of a baseline Coefficient of Lift versus Angle of Attack curve for the first section of the blade as shown in FIG. 2 as well as five modified Coefficient of Lift versus Angle of Attack curves for the same section with different severities of structural deterioration.
Figure 5:
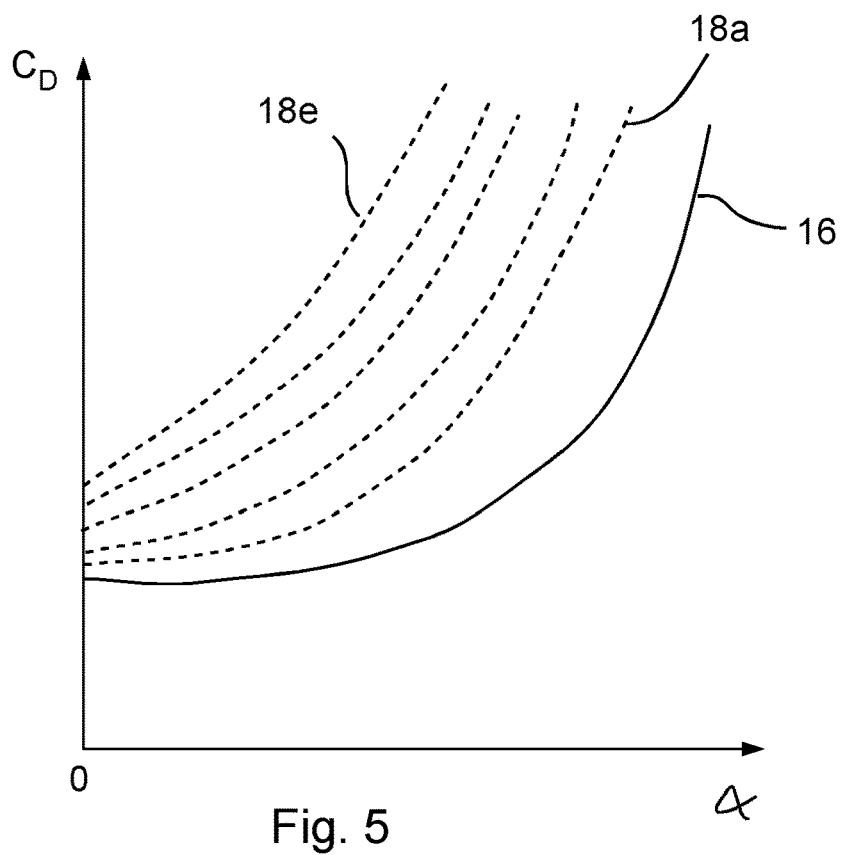
FIG. 5 schematically shows an example of a baseline Coefficient of Drag versus Angle of Attack curve for the first section of the blade as shown in FIG. 2 as well as five modified Coefficient of Drag versus Angle of Attack curves for the same section with different severities of structural deterioration.
Figure 6:
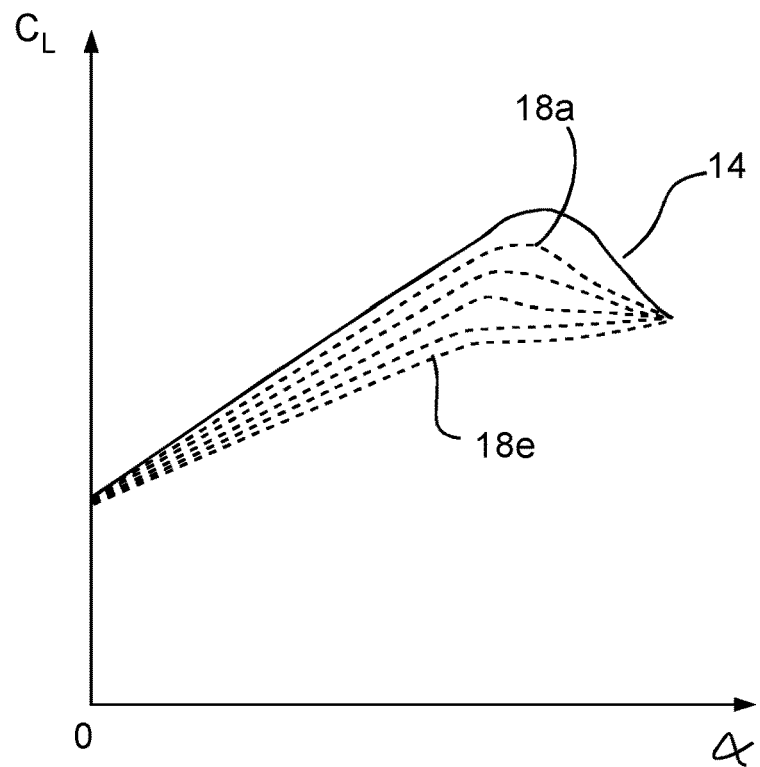
FIG. 6 schematically shows an example of a baseline Coefficient of Lift versus Angle of Attack curve for the second section of the blade as shown in FIG. 3 as well as five modified Coefficient of Lift versus Angle of Attack curves for the same section with different severities of structural deterioration.

In order to illustrate the computer system in more detail, some different embodiments of the computer system are described below. These are just some embodiments covered by the current scope of the current claims, and it should be clear to the person skilled in the art when taking their knowledge as well as the contents of this specification in its entirety, that other embodiments of the computer system could also be developed.

It should also be noted that the figures show schematic curves to illustrate the principles of the invention. Some of the curves are drawn in an exaggerated manner. The person skilled in the art should be able to provide relevant and realistic curves for a particular blade based on the teachings of this specification together with the knowledge of the person skilled in the art of aerodynamics and wind turbine blades.

It should also be noted that a number of steps need to be performed to acquire the estimated AEP change of a wind turbine. Certain steps can be or need to be performed by human operators and certain steps are performed by the computer system. It should also be noted that depending on the complexity of the computer system more or less functions could be performed by the computer system. For example, in one embodiment, an artificial intelligence program is used in the computer system to analyse images, whereas in another embodiment, a human expert is used to analyse the images.

It should also be noted that in certain cases, the computer system could comprise multiple different computing stations which communicate. Some examples of this will be described below.

To analyse the expected AEP losses of a wind turbine according to the current invention, one starts by acquiring a 3D model of the original clean blade. One option for doing this is via original CAD data from the manufacturer of the blade. Another option is to make a 3D scan of the original clean blade to generate a 3D model of the original clean blade. In another embodiment, one could make a 3D scan of a used blade and then remove any identified structural deteriorations in the 3D model to get an estimated clean 3D model of the original blade.

FIG. 1 shows a schematic sketch of a wind turbine blade 1. A number of main sections 2 are shown evenly spaced along the blade. Two sections, defined by the lines II-II and III-III are shown in FIGS. 2 and 3 respectively. A first aerofoil section 4 taken closer to the root 6 of the blade is shown in FIG. 2 and a second aerofoil section 8 taken closer to the tip 10 is shown in FIG. 3. For the sake of the procedure described below, additional sub sections 12 are provided between adjacent main sections. In the figure, there are 6 main sections and 9 sub sections between any two main sections. This gives a total of 51 aerofoil sections describing this blade. In a real procedure, the specific number of main sections and subsections, as well as the distance between them can be chosen as desired. A model which is based on a non-equal spacing could also be used.

The 3D model of the blade is then updated with any relevant add-ons. For example, if there are gurney flaps (GF), vortex generators (VG), serrations(S) etc., then these are added to the 3D model of the blade.

The 3D model of the original blade (clean blade with any add-ons) is then loaded into the computer system.

The computer system then applies the 3D model of the original blade to a 3D CFD program and a 3D CFD analysis of the blade is made.

The 3D CFD model is sliced at a certain number of main locations (example 6 as shown in FIG. 1).

The main slices are analysed and a Coefficient of Lift versus Angle of Attack curve and a Coefficient of Drag versus Angle of Attack curve is generated for each slice.

An example of baseline lift and drag curves for the first section 4 and second section 8 are shown in the solid lines 14, 16 in FIGS. 4-7.

The blade is then further sliced a certain number of times between each main slice (for example 9 additional slices between each of the main slices as shown in FIG. 1).

The previously generated Lift and drag curves at the main sections 2 are then interpolated to generate intermediate Lift and drag curves at each subsection 12. It is also possible to manually generate the many lift and drag curves directly from the 3D CFD results, however, this requires more computing time and the extra accuracy is not always so noticeable in the final result.

In another embodiment, instead of making a 3D CFD analysis of the entire blade and then slicing the 3D CFD results, a 3D model of the blade is sliced to get a number of 2D aerofoils. A 2D CFD analysis is then applied to each 2D aerofoil to get a table of estimated lift and drag curves at each location. As in the above case, the analysis could be performed at each main and sub section or the analysis could be performed at each main section and then the results could be interpolated to generate the lift and drag curves at the sub sections.

In any case, at the end of this step, the computer system has a dataset which represents the baseline lift and drag curves of the original blade with any add-ons at a number of radial positions of the blade.

In this respect, it should be noted that in one example, the CFD analysis is performed on a dedicated CFD analysis computer and then the results are uploaded to a server which performs the next steps in the method. In this example, the dedicated CFD analysis computer and the server are both part of the "computer system", even though they could be located at two separate locations. For people skilled in the art of computer systems, it is known to split different tasks out to different sub systems.

From the estimated baseline lift and drag curves of the original blade, the computer system then generates a baseline AEP estimation by running a BEM simulation based on the curves of the original blade. This gives a baseline AEP result of the turbine as originally manufactured. The procedure for running a BEM simulation is well known to the person skilled in the art and won't be described in detail here. However, the basic steps involved in the process are to generate a power curve for the wind turbine at different wind speeds and then apply a set of wind data to estimate the total power production over the course of a year. In most cases a statistical set of standard wind speed data is used to generate the AEP estimation. However, if historical wind speed data for the specific location is known, then this can be applied to the BEM model to get a more accurate estimation of the expected AEP.

The computer system then loads one or more datasets representing aerodynamic effects of identified structural deteriorations at each radial location and for each blade. Examples of relevant data and formats for such datasets is described in more detail below.

The computer system then generates for each blade and for each slice (i.e. for each radial location on the blade), a modified lift and drag curve based on the dataset of the aerodynamic effects of the actual type of structural deterioration found at that location. For example, if the dataset shows that at 20 m from the root of the blade, there is a missing VG and there is X amount of leading edge erosion, then the computer system generates modified lift and drag curves for this location which takes the baseline curve and modifies it to represent the aerodynamic effects of a missing VG and X amount of leading edge erosion. This modification can be done in different ways. Some examples are provided later on in this specification.

It should be noted that the dataset of aerodynamic effects could be in different formats. In one example, the dataset comprises the modified curves themselves. In another example, the dataset comprises data on how to modify the baseline curves.

The computer system will then have modified lift and drag curves for each of the blades. Since the structural deteriorations of the different blades of a single turbine can be different, the computer system will have a number of sets of modified lift and drag curves, one for each blade of the wind turbine. If there are three blades on the turbine, then there will be three sets of modified lift and drag curves, one for each of the three blades.

Based on these modified lift and drag curves, the computer system then builds a modified BEM model which represents the wind turbine with the structurally deteriorated blades.

It should be noted that the standard BEM model assumes identical blades. As such a standard BEM model is not directly suitable to model a situation where the different blades have different structural deteriorations. Hence, in one embodiment of the current invention, a first BEM model is created based on the modified lift and drag curves of the first blade and additional BEM models of the other blades are created based on respective modified lift and drag curves of the other blades.

For example, in a three bladed wind turbine, the computer system will have three sets of modified lift and drag curves, one for each blade. The system will then build a first BEM model of a three bladed wind turbine assuming that all three blades of the first model can be represented by the modified lift and drag curves of the first blade of the real wind turbine. The computer system will then do the same for the second and third blades, thereby ending up with three separate BEM models of three separate wind turbines. The first BEM model is assumed to have three identical blades equal to the first blade of the real turbine, the second BEM model is assumed to have three identical blades equal to the second blade of the real turbine, etc.

The different models are then analysed to get an estimate AEP of all three turbines and then an average is found. In the example above, the three estimated AEPs are summed and divided by three to get a total estimate of the AEP of the real turbine with structural deteriorations. Due to this, the effects of one structurally heavily damaged blade will show up proportionally on the overall estimated AEP of the turbine.

In one embodiment, the computer system can then further compare this estimated AEP of the "real" turbine to the baseline AEP of the "original" turbine to get an estimated AEP change or an estimated percentage change in AEP due to the structural deteriorations.

As mentioned above, there are multiple different ways to develop the modified curves. In the following a few different methods are described. However, other methods can also be used.

In a first embodiment, the computer system only takes into account structural deterioration to the blade itself and does not take into account damage to any add-ons or any missing add-ons.

Figure 7:
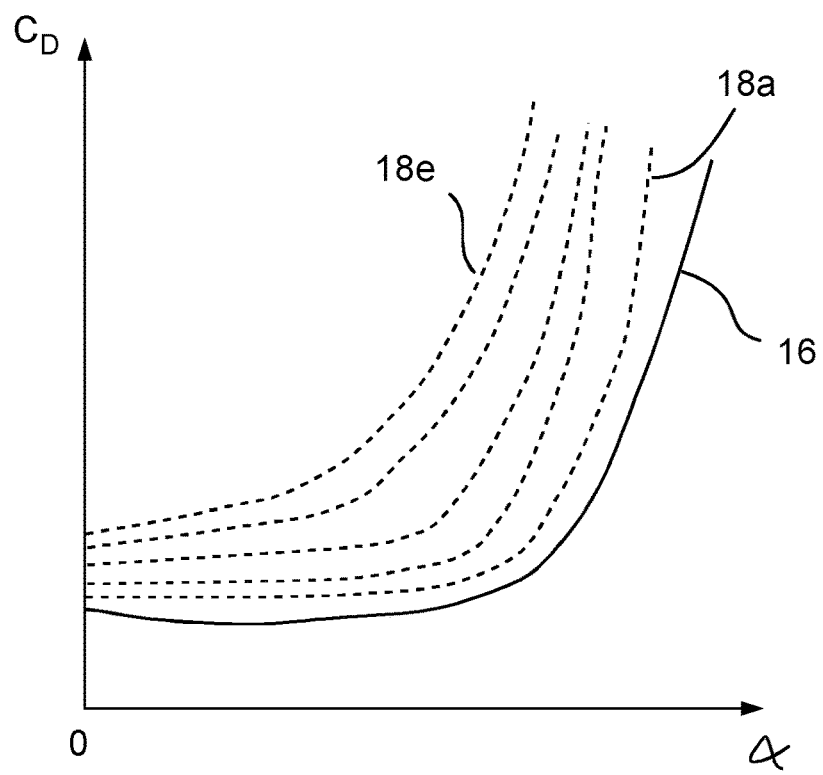
FIG. 7 schematically shows an example of a baseline Coefficient of Drag versus Angle of Attack curve for the second section of the blade as shown in FIG. 3 as well as five modified Coefficient of Drag versus Angle of Attack curves for the same section with different severities of structural deterioration.

In this embodiment, a number of modified curves of each baseline curve are generated representing increasing levels of leading edge damage to the airfoil. An example of this is shown in FIGS. 4,7. In this case, the solid line in FIGS. 4-7 show the baseline curves for lift and drag respectively. These are the curves which represent the aerodynamic characteristics of the original blade. Five additional curves 18a-e are generated to illustrate what happens for increasing levels of leading edge damage. Five such curves are generated for each slice of the blade, both main and sub slices. The curves can be generated by simulating increasing amounts of damage to the blade in a CFD analysis, or the curves can be generated by rules resulting from experience. For example, one could start by testing a single section of the blade in a wind tunnel (or via CFD) and applying increasing levels of damage and measuring (calculating) the modified curves. The observed effects can then be parameterized and the parameterized observations can be applied to other sections of the blade. In this way, it is not necessary to do a simulation of each and every section of the blade, but observations from one section can be applied to other sections.

In general, the following comments could be made about the effects of structural deterioration.
  Outboard aerofoils (FIG. 3) are thinner than inboard aerofoils (FIG. 2)
  Thin aerofoils suffer less from structural deterioration than thick
  Thin aerofoils have higher $C_{Lmax}$
  Thin aerofoils have lower $C_D$ (more pronounced before stall)

In one embodiment, we generate five modified curves for each slice and baseline. If we had six main slices and nine sub slices, then we would have 51 clean baseline curves. If we use five "damage curves", then we would also generate 255 modified curves. In one option, we generate the modified curves at the 6 main slices to get 30 modified curves which we then interpolate in between the main slices to get the 255 modified curves. In another option, we generate the 51 interpolated clean curves and then generate 255 modified curves based on the 51 interpolated clean curves.

A table is then generated which identifies which modified curve to use at each location. For example, for a serious leading edge erosion at 5 m from the root of the blade, modified curve 18e is chosen. For a long but smooth crack in the leading edge of the blade, modified curve 18a is chosen. For a location without any damage, the baseline curve is chosen. The choice of modified curve can be done in different ways. In a first way, an image of the blade is shown to an aerodynamic expert who identifies any damage and chooses which modified curve to use. The expert then adds the choice of curve and the radial location of the damage to a table which the computer system can read to generate the table of curves to use for the modified BEM model of the blade.

In another embodiment, images of the blade are shown to a structural expert. The structural expert identifies the type of damage, its severity and its location on the blade, and adds this information to a table of structural deteriorations. The computer system can then apply a transfer function to this structural data table to convert it into aerodynamic effect data. For example, the transfer function can translate a Leading edge erosion of severity 5 into a modified curve 18e choice. Likewise, a crack of severity 5 will translate into a modified curve 18a choice. Even though the structural effect of a large crack is severe, the aerodynamic effect is small. In this way, existing structural deterioration data can be easily converted into aerodynamic effect data.

If there are multiple damages at one location, for example a crack and leading edge erosion, then the damages can be combined. The combination could be done in different ways. In one embodiment, the computer system could be arranged to choose the damage which has the highest aerodynamic penalty and then ignore the other damage. In another embodiment, the system could be provided with more complex rules for combining damage. One option is discussed in more detail below.

In another embodiment, instead of pre-generating all the modified curves, the baseline curves can be described in a parameterized manner. The parameters of the curve can be stored in a table and based on the parameters in the table, the baseline curve can be generated by the computer system. The effects of different types of damage can then be specified as penalty factors which are applied to the parameters of the baseline curve to generate the modified curves.

Figure 8:
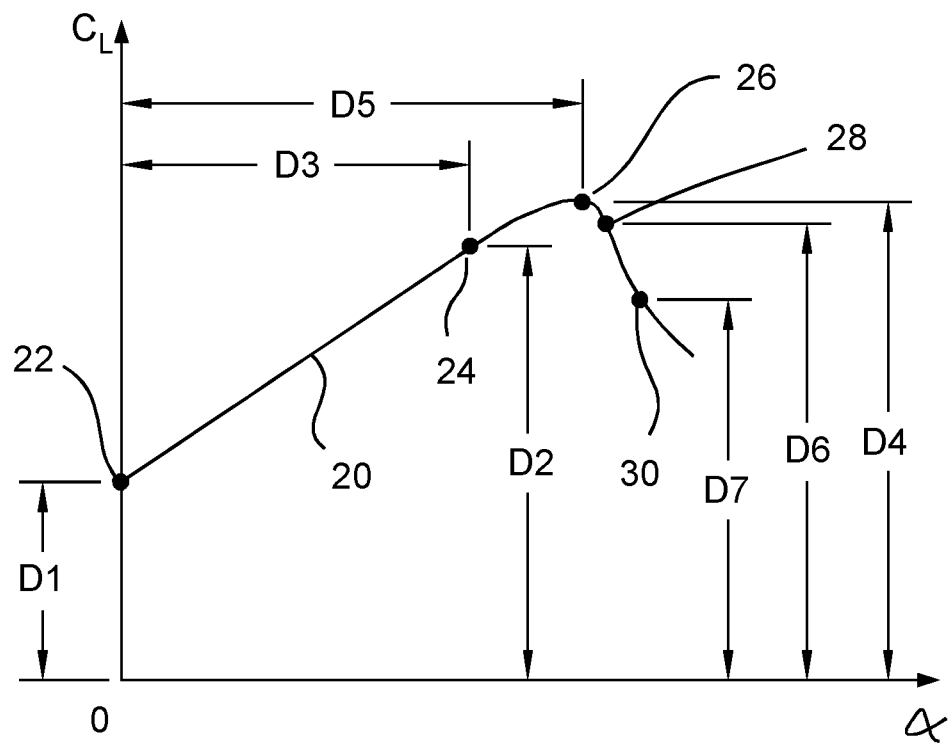
FIG. 8 shows a schematic example of a baseline Coefficient of Lift versus Angle of Attack curve for a section of the blade for use in the method and examples of parameters to describe the curve in a parameterized manner.
Figure 9:
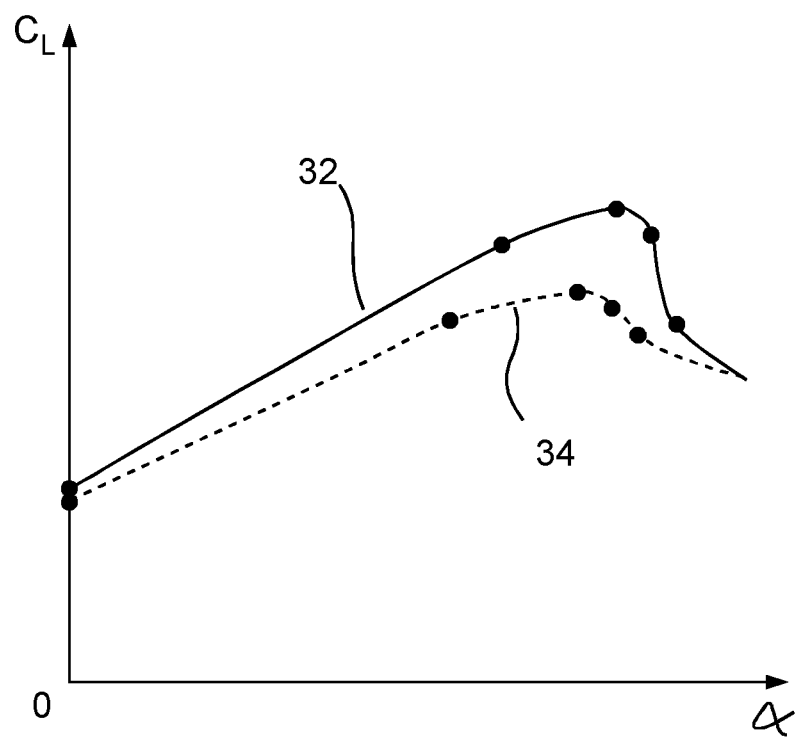
FIG. 9 shows an example of a baseline Coefficient of Lift versus Angle of Attach curve as shown in FIG. 8, and a modified curve based on applying penalty factors to the parameters of the baseline curve.

FIGS. 8 and 9 illustrate this in more detail. In FIG. 8, a baseline Coefficient of Lift versus Angle of Attack curve 20 is shown. The curve is defined by five points, 22, 24, 26, 28, 30. The first point 22 is the coefficient of lift at 0 degrees angle of attack. This is defined by the dimension D1. The second point 24 is defined as the end of the linear region. This is defined by the dimensions D2 and D3, where D2 is the coefficient of lift at the end of the linear portion and D3 is the angle of attack at the end of the linear region. The third point 26 is the point of maximum Coefficient of Lift ($C_{LMax}$). It is defined by the dimension D4 and D5, where D4 is the maximum coefficient of lift and D5 is the angle of attack at $C_{LMax}$. The fourth point 28 is the coefficient of lift 1 degree after $C_{LMax}$ and is defined by the dimension D6 and 1 degree after $C_{LMax}$. The fifth point 30 is the coefficient of lift 2 degrees after the angle of attack at $C_{LMax}$ and is defined by the dimension D7 and 2 degrees after the angle of attack at $C_{LMax}$.

In this way, instead of storing a table with the actual curve, a table can just comprise these seven parameters for each curve. Based on the parameters, the system can build all the curves.

To generate the modified curves, the system can store a table of "penalty factors" to apply to the parameters. For example, if the $C_{LMax}$ is known to decrease by 5% with a leading edge erosion of severity 3, then a penalty factor of 0.95 can be applied to the $C_{LMax}$ of the baseline curve. For each type and severity of damage, a set of penalty factors can be provided. The penalty factors can be developed by using simulations and then parameterizing the curves, or they can be developed based on experience. The person skilled in the art will be able to generate penalty factors for different types of damage in the above described way based on his or her experience and knowledge.

TABLE 1

Example of penalty factors

| Parameter | Penalty factor |
| --- | --- |
| D1 | 0.9 |
| D2 | 0.8 |
| D3 | −1 |
| D4 | 0.8 |
| D5 | −1 |
| D6 | 0.95 |
| D7 | 0.9 |

As one example, if one considers the baseline curve 32 shown in FIG. 9, then one could apply penalty factors as shown in Table 1 above to get the modified curve 34 shown in FIG. 9. The penalty factors could be a percentage penalty, for example 0.9 represents a 10% reduction or the penalty factors could be an absolute penalty, for example a reduction in the angle of attack at $C_{LMax}$ of 1 degrees represented by a penalty factor of −1.

To make the system useable, each type of damage is represented by a table of penalty factors. For example, leading edge erosion can be classified into five levels of severity, where each level of severity has a predefined effect on the curves. Then at each radial location of the blade, an aerodynamic type of deterioration is specified along with a severity if relevant.

For example, it might be specified that at 20 m from the root of the blade, there is a structural deterioration which acts like a leading edge erosion of severity 5. The computer system can then lookup the parameterized penalty factor of how a leading edge erosion type of severity 5 affects the baseline curve and then apply these effects to the baseline curve to get the modified curve. Or it might be specified that at 30 m from the root of the blade there is a missing VG. Again, the system can modify the baseline curve at this location based on the identification that there is a missing VG. In this way, instead of pre-generating a large number of possible curves at each location, a single modified curve is generated at each location based on known penalty factors for the specific damage at that location.

TABLE 2

Dataset representing structural deteriorations

| Wind turbine ID | Blade ID | Radial Location | Type of Structural Deterioration | Severity of Structural Deterioration |
| --- | --- | --- | --- | --- |
| 001 | A | 20 m | Missing VG | 5 |
| 001 | A | 30 m | Missing VG | 5 |
| 001 | A | 30 m | LE erosion | 3 |
| 001 | B | 40 m | LE erosion | 4 |
| 002 | A | 10 m | LE Erosion | 2 |
| 002 | B | 40 m | Missing GF | 5 |
| 002 | C | 20 m | LE crack | 5 |

An example data table is shown in table 2. Here every structural deterioration is described in the table, by an ID of the wind turbine itself, an ID of the blade, the radial location on the blade, the structural deterioration type and the severity. This data is translated via a transfer function into the aerodynamic effect table shown in table 3.

TABLE 3

Dataset representing aerodynamic effects of structural deteriorations

| WT ID | Blade ID | Radial Location | D1 | D2 | D3 | D4 | D5 | D6 | D7 |
| --- | --- | --- | --- | --- | --- | --- | --- | --- | --- |
| 001 | A | 20 m | PF1a | PF2a | PF3a | PF4a | PF5a | PF6a | PF7a |
| 001 | A | 30 m | PF1b | PF2b | PF3b | PF4b | PF5b | PF6b | PF7b |
| 001 | A | 30 m | PF1c | PF2c | PF3c | PF4c | PF5c | PF6c | PF7c |
| 001 | B | 40 m | PF1d | PF2d | PF3d | PF4d | PF5d | PF6d | PF7d |
| 002 | A | 10 m | PF1e | PF2e | PF3e | PF4e | PF5e | PF6e | PF7e |
| 002 | B | 40 m | PF1f | PF2f | PF3f | PF4f | PF5f | PF6f | PF7f |
| 002 | C | 20 m | PF1g | PF2g | PF3g | PF4g | PF5g | PF6g | PF7g |

To convert from the structural deterioration to the aerodynamic effect, a transfer function is used. The transfer function can take many forms, but in one embodiment, the transfer function is in the form of a lookup table, where the type of structural deterioration and severity is looked up in a table which then gives the penalty factors to be applied to the curve. For example a table can be provided for all the severities of leading edge erosion and then the transfer function can lookup the penalty factors in the table and apply these to get the resulting penalty factors at each location.

For cases where there are multiple overlapping types of structural deterioration, the computer system can be provided with rules on how to combine the different types of effects of the structural deterioration. However, in certain cases, it might be difficult to provide a good rule on how to combine the different effects. For example, the effects of leading edge erosion where there is a VG and where there is no VG are difficult to model with two simple penalty factors one for the missing VG and one for the LE Erosion which are multiplied or added together. Hence, in this case, multiple tables might be provided for different base conditions. For example a table of aerodynamic parameters is provided where a first set of entries relates to Leading Edge erosion for different severities for the case with a VG and a separate set of entries is provided when there is no VG. In this case, depending on whether or not there is a VG, different parameters can be chosen. For example:

TABLE 4

Penalty factors for specific deteriorations

|  | LE Erosion Severity 1 + VG missing | LE Erosion 1 with VG | LE Erosion 2 + VG Missing | LE Erosion 2 with VG | LE Erosion 3 + VG Missing | LE Erosion 3 with VG | Etc . . . |
|---|---|---|---|---|---|---|---|
| Param 1 | X1 | X2 | X3 | X4 | X5 | X6 |  |
| Param 2 | Y1 | Y2 | Y3 | Y4 | Y5 | Y6 |  |
| Param 3 | Z1 | Z2 | Z3 | Z4 | Z5 | Z6 |  |
| Etc . . . |  |  |  |  |  |  |  |

For example, when considering Table 4, for the case where there is a missing VG and there is leading edge erosion of severity 3 then the parameters X5, Y5 and Z5 would be chosen. In another case if there VG is not missing and there is LE Erosion of severity 1, then the parameters X2, Y2, Z2 would be chosen.

If additional forms of add-ons need to be taken into account, then the table could be provided with more options. For example (VG=Vortex Generator, GF=Gurney Flap, S=Trailing Edge Serrations):

TABLE 5

Another form of penalty factors for specific deteriorations

| LE Erosion | 1 | 2 | 3 | 4 | 5 | 1 | 2 | 3 | 4 | Etc . . . |
|---|---|---|---|---|---|---|---|---|---|---|
| VG |  |  |  |  |  | X | X | X | X | X |
| GF | X | X | X | X | X | — | — | — | — |  |
| S | X | X | X | X |  | X | X | X | X |  |
| Param 1 | X1 | X2 | X3 | X4 | X5 | X6 | X7 | X8 | X9 |  |
| Param 2 | Y1 | Y2 | Y3 | Y4 | Y5 | Y6 | Y7 | Y8 | Y9 |  |
| Param 3 | Z1 | Z2 | Z3 | Z4 | Z5 | Z6 | Z7 | Z8 | Z9 |  |
| Etc . . . |  |  |  |  |  |  |  |  |  |  |

In this example, the system could look up the parameter set which best fits the current situation. For example, LE Erosion 2+VG present+GF missing+S present would choose parameters X7, Y7, Z7.

If there are multiple deteriorations which interact in an easy way, then the tables could be setup so that all the penalty factors for all the different deteriorations could be applied to the baseline curve, one after the other. For example a table could be provided as follows:

TABLE 6

Another form of penalty factors for specific deteriorations

| LE Erosion | 1 | 2 | 3 | 4 | 5 |  | 1 | 2 | Etc . . . |
|---|---|---|---|---|---|---|---|---|---|
| VG | X | X | X | X | X | X | — | X | X |
| GF | X | X | X | X | X | — | X | — | — |
| S | X | X | X | X | X | X | X | X | X |
| Param 1 | X1 | X2 | X3 | X4 | X5 | X6 | X7 | X8 | X9 |
| Param 2 | Y1 | Y2 | Y3 | Y4 | Y5 | Y6 | Y7 | Y8 | Y9 |
| Param 3 | Z1 | Z2 | Z3 | Z4 | Z5 | Z6 | Z7 | Z8 | Z9 |
| Etc . . . |  |  |  |  |  |  |  |  |  |

For example, taking table 6 into consideration, in a case where there is a missing VG, a missing GF and a LE erosion of severity 2, then the penalty factors of the missing VG (X7,Y7,Z7) are applied to the baseline curve first, then the penalty factors of a missing GF (X6,Y6,Z6) are applied to the previously modified curve, then the penalty factors of the LE erosion of severity 2 for the case where there is a missing VG or GF (X9,Y9,Z9) are applied to the modified curve.

The parameters could be provided in different tables or combined into a single table. The principle is essentially the same, just the way of choosing the penalty factors is different.

It should also be noted, that depending on the geometry of the blade used, it might be necessary to provide different tables for different sections of the blade. For example, the effects of a missing VG at the tip or at the root of the blade will be quite different. Likewise, the effects of Leading Edge Erosion for a thin aerofoil will be different than for Leading Edge erosion for a thick aerofoil. Hence, it might be necessary to split the blade into separate sections and have different tables for the different sections of the blade.

Depending on the level of complexity desired, the number of entries in the tables can be increased or decreased and the procedure to map the structural deteriorations to the aerodynamic effects can be changed. However, one of the large benefits of this model, is that even applying significant simplifications, can still result in a useful comparison between different wind turbines in a park since the same simplifications are applied to each of the wind turbines in the same manner. Therefore the "error" in the estimations will be reflected in all the estimations. Hence, even though the actual estimation of AEP might be quite off, the relative effects of the different structural damages to the different wind turbines should still be evident in the final results. Hence, planning of repair work and prioritization of repair work can still be optimized based on even a heavily simplified model.

It is to be noted that the figures and the above description have sometimes shown and described the example embodiments in a simple and schematic manner. Many of the more specific details have not been shown or described since the person skilled in the art should be familiar with these details and they would just unnecessarily complicate this description. For example, the specific PC, server and network used and the specific programming language and coding used have not been described in detail since it is maintained that the person skilled in the art would be able to find suitable components and programming solutions to provide the system according to the current invention.

The invention claimed is:
1. A computer system suitable for estimating and/or calculating an expected and/or actual change in annual energy production (AEP) of a wind turbine due to identified structural deterioration of blades of the wind turbine, said computer system being arranged to execute the following steps:
  a. loading a dataset representing estimated lift and drag curves at specific radial locations along an original blade of the wind turbine,
  b. building a baseline Blade Element Momentum (BEM) model of the wind turbine based on said estimated lift and drag curves of the original blade and analysing the model to provide a baseline AEP estimation of the wind turbine with original blades,
  c. loading a dataset representing aerodynamic effects of identified structural deteriorations at specific radial locations along each of the blades of the wind turbine,
  d. using the dataset of aerodynamic effects to generate modified lift and drag curves at specific radial locations along each of the blades,
  e. building a modified BEM model of the wind turbine based on the modified lift and drag curves, and
  f. analysing the modified BEM model to get an estimate of the AEP of the wind turbine when the structural deteriorations are taken into account.

2. The computer system according to claim 1, wherein the computer system is arranged to calculate the change in annual energy production (AEP) of a specific physical wind turbine due to the identified and measured structural deterioration of the blades of the wind turbine.

3. The computer system according to claim 1, wherein a separate modified BEM model is generated for each blade of the wind turbine, each separate modified BEM model being based on the aerodynamic effects of the identified structural deteriorations of one of the blades and then the calculated and/or estimated AEP of the separate modified BEM models for the separate blades are combined to get a calculated and/or estimated AEP for the entire wind turbine.

4. The computer system according to claim 1, wherein the dataset representing aerodynamic effects of identified structural deterioration is generated by
  a. loading a dataset representing structural deteriorations of the blades comprising type of deterioration, severity of deterioration and location on the blade, and
  b. applying a transfer function which converts the type and severity of the structural deterioration at each blade location to an aerodynamic effect at said blade location and stores it in the dataset representing aerodynamic effects.

5. The computer system according to claim 4, wherein the dataset representing structural deteriorations is generated by
  a. loading images of the blade of a wind turbine,
  b. showing the images to an evaluator which evaluates the images and identifies specific types of structural deteriorations, their severity and their radial location on the wind turbine blade, and
  c. enabling the evaluator to enter data related to the identified structural deteriorations into the computer system and storing said data in the dataset, said data including at least an identification of the wind turbine, an identification of the wind turbine blade, the type of structural deterioration, a rating of the severity of the deterioration and the radial location of the structural deterioration on the blade.

6. The computer system according to claim 5, wherein the type of structural deterioration is chosen from a closed list of standard options and the rating of the severity is chosen according to a standardized scale.

7. The computer system according to claim 4, wherein the computer system comprises a display and a human machine interface for entering data by a human user and in that the computer system is arranged to display images on the display and accept data input related to an evaluation of the structural deterioration from the human user.

8. The computer system according to claim 4, wherein an evaluator is a software-based image recognition system and in that the software-based imaged recognition system enters data related to the structural deteriorations directly into the dataset stored in the computer system.

9. The computer system according to claim 1, wherein the dataset representing aerodynamic effects of identified structural deterioration is generated by
  a. loading images of the wind turbine,
  b. showing the images to an evaluator which evaluates the images and identifies specific types of structural deteriorations, their severity and their radial location on the wind turbine blades, and
  c. enabling the evaluator to enter data related to the aerodynamic effects of the identified structural deteriorations into the computer system and storing said data in the dataset, said data including at least an identification of the wind turbine, an identification of the wind turbine blade, the aerodynamic effect of the structural deterioration and the radial location of the structural deterioration on the blade.

10. The computer system according to claim 1, wherein the dataset representing estimated lift and drag curves at specific radial locations along the original blade of the wind turbine is generated by the computer system which is arranged to execute the following steps:
  a. loading a 3D model of the original blade, and
  b. applying Computational Fluid Dynamic (CFD) analysis to the loaded 3D model of the original blade to generate a table of estimated lift and drag curves at specific radial locations along the original blade.

11. The computer system according to claim 1, wherein the dataset representing estimated lift and drag curves at specific radial locations along the original blade of a wind turbine is generated by the computer system which is arranged to execute the following steps:
  a. loading a 3D model of the original blade,
  b. slicing the 3D model of the original blade at specific radial locations along the original blade to get 2D aerofoils at the specific radial locations along the original blade, and
  c. applying Computational Fluid Dynamic (CFD) analysis to the 2D aerofoils to generate a table of estimated lift and drag curves at said specific radial locations along the original blade.

12. The computer system according to claim 1, wherein the computer system is further arranged to load datasets representing aerodynamic effects of identified structural deteriorations related to multiple wind turbines and perform the same estimation of AEP change on each of the multiple wind turbines to generate a dataset representing the estimated change in AEP of the multiple wind turbines.

13. The computer system according to claim 1, wherein the computer system comprises a structural deterioration model representing an estimation of a development of structural deteriorations of the blades over time and in that the computer system is arranged to apply the structural deterioration model to the current structural deterioration data to develop a future estimate of the structural deterioration data of a blade at a point of time in the future and then to rerun an analysis for aerodynamic effects with the estimated future structural deterioration to find the estimated AEP change at a point of time in the future.

* * * * *